United States Patent [19]

Drauglis

[11] Patent Number: 4,470,672
[45] Date of Patent: Sep. 11, 1984

[54] TELESCOPE

[75] Inventor: Clyde O. Drauglis, Willow Grove, Pa.

[73] Assignee: Edmund Scientific Company, Barrington, N.J.

[21] Appl. No.: 372,629

[22] Filed: Apr. 28, 1982

[51] Int. Cl.³ ............................................. G02B 23/16
[52] U.S. Cl. ................................................... 350/568
[58] Field of Search ............................... 350/568, 567

[56] References Cited

U.S. PATENT DOCUMENTS

| 3,257,728 | 6/1966 | Blomquist | 350/568 X |
| 3,603,664 | 9/1971 | James | 350/568 |
| 3,751,134 | 8/1973 | McMahon | 350/568 |

Primary Examiner—John K. Corbin
Assistant Examiner—Lynn Vandenburgh
Attorney, Agent, or Firm—Howson and Howson

[57] ABSTRACT

Secured to the barrel of a reflecting telescope is a large mounting ring the axis of which is perpendicular to the barrel axis. The mounting ring extends from an intermediate location on one side of the barrel, around the mirror end of the telescope, and back to an intermediate location on the opposite side of the barrel. The combination of the ring and barrel has its center of gravity approximately at the location of the ring axis. The ring is supported in a cradle on frictional pads. Because the telescope is well-balanced, friction alone can be relied upon to hold the telescope in any desired elevational position. An undercut circumferential groove is provided in the periphery of the mounting ring, and rollers within the undercut groove urge the ring against the frictional pads. The force with which the ring is urged against the pads can be adjusted in order to vary the degree of friction, and also to lock the telescope at a desired elevation. Using a Cassegrain or similar optical configuration with a diagonal mirror, the eyepiece can be positioned on the ring axis and remains stationary as elevation is adjusted.

13 Claims, 8 Drawing Figures

TELESCOPE

BRIEF SUMMARY OF THE INVENTION

This invention relates to telescopes and has particular utility in small astronomical telescopes of the kind used by amateur astronomers.

Small astronomical telescopes are typically supported on counterbalanced equatorial mounts, on equatorial fork mounts or on altitude-azimuth fork mounts. Mounts of all three types have useful features. However, they also have certain inherent problems. The rigidity necessary for astronomical use is usually achieved only when the telescope is comparatively heavy and difficult to transport. When the direction of the optical axis of the telescope is changed, it is normally necessary to loosen and then retighten one or more locking devices. In general, it is not possible to rely upon friction alone to hold the optical axis of the telescope in fixed position. Furthermore, in some cases, the locking devices are not entirely effective to hold the telescope in the desired position.

In the case of an equatorial mount, whether it be of the counterbalanced type or of the forked type, it is not easy to move the optical axis of the telescope rapidly from one horizon to the opposite horizon. With typical telescopes of the altitude-azimuth type using a fork mount, it is difficult to view objects directly overhead, and it is impossible to swing the telescope directly through the zenith. A fork mounted telescope can be designed so that it swings through the zenith, but this is usually accomplished either by the use of exceptionally long fork arms or by pivoting the telescope barrel at a location well spaced from its midpoint. These solutions are achieved at the expense of excessive weight, poor rigidity or both.

Another problem with conventional small astronomical telescopes is that setting circles are small and difficult to read accurately.

Still another problem with conventional small astronomical telescopes, particularly telescopes with long barrels, is that the eyepiece position varies through a wide range so that the eyepiece is sometimes difficult to reach. This is a particularly troublesome problem when the telescope is being used by a group including small children. U.S. Pat. No. Des. 247,854, dated May 9, 1978, shows a small astronomical telescope, part of the barrel of which is in the form of a large sphere. The spherical part of the barrel rests on three frictional pads on a base. The telescope is well-balanced, and friction alone is depended upon to hold the optical axis of the telescope in the desired position. The telescope of U.S. Pat. No. Des. 247,854, however has no provision for locking its optical axis in a particular position, and no provision for markings which would enable the user of the telescope to record or reproduce particular settings. Normally, its eyepiece is easily reachable. However, when tracking an object in the sky, it is possible for the eyepiece to reach an awkward position, necessitating rotating the telescope about its optical axis and risking the loss of the object.

Telescopes in accordance with the present invention overcome some or all of the problems encountered with counterbalanced telescopes, fork mounted telescopes and spherical barrel telescopes. The telescope in accordance with the invention is primarily useful as an altitude-azimuth mounted telescope. However, it is possible to make use of the principles of the invention in an equatorially mounted telescope. Likewise, while the invention is primarily intended for reflecting telescopes of various types, it is useful with refracting telescopes as well.

The telescope in accordance with the invention comprises a telescope assembly having a barrel with a principal optical axis and optical means associated with the barrel for collecting light from an object located on the principal optical axis and forming an image of the object. A circular mounting ring is fixed to the barrel and has its axis arranged substantially perpendicular to the principal optical axis of the telescope. These two axes intersect approximately at the center of gravity of the combination of the mounting ring and the telescope assembly. The ring is sufficiently large that its periphery extends to the approximate location of one end of the telescope barrel. The mounting ring is supported in a cradle which permits rotation of the ring about its axis for adjustment of the direction of the optical axis of the telescope in a plane perpendicular to the ring axis. The cradle means and the ring, however, have cooperating means for maintaining the ring axis in fixed relationship to the cradle and for constraining the ring against translational movement with respect to the cradle along the ring axis.

The large mounting ring cooperates with frictional pads on the cradle. Because the diameter of the ring is comparatively large, and the center of gravity of the ring-telescope assembly combination is approximately at the location of the ring axis, the telescope is well-balanced, and friction alone can be depended upon for holding the optical axis of the telescope in the desired position under normal circumstances. The mounting ring permits the telescope to swing from horizon to horizon through the zenith without any difficulty. The azimuth of the telescope is adjusted by rotating the cradle about a vertical axis.

The mounting ring can be readily locked into any desired position by means of one or more locking devices which cooperate with a slot in the ring. These devices can also be used to adjust the friction between the cradle and the ring.

Markings can be provided on the ring and on the cradle for measuring altitude. The large size of the ring makes it possible to read altitude with high precision.

One important object of the invention is to provide an improved telescope mount which is both light in weight and at the same time sufficiently rigid to be used for a wide variety of astronomical purposes.

Another important object of the invention is to provide a versatile small astronomical telescope which, like the telescope of U.S. Pat. No. Des. 247,854, can be held in place normally by friction alone, but which can also be locked into any desired position.

Still another important object of the invention is to provide a light-weight astronomical telescope which can be readily and easily aimed at any desired point in the sky.

Still another object of the invention is to provide an astronomical telescope, the eyepiece of which is always easily reached. In accordance with the invention, this is accomplished by positioning the eyepiece so that the eyepiece axis is parallel to the mounting circle axis. Moving from horizon to zenith, the height of the eyepiece only changes by an amount equal to the distance between the eyepiece axis and the mounting ring axis. In a special version of the invention, the eyepiece axis is substantially aligned with the mounting ring axis. In this special version, the height of the eyepiece always remains substantially constant.

The foregoing objects, as well as various other objects of the invention and the details of the means by which they are accomplished will be apparent from the following detailed description when read in conjunction with the drawings.

DETAILED DESCRIPTION

Figure 1:
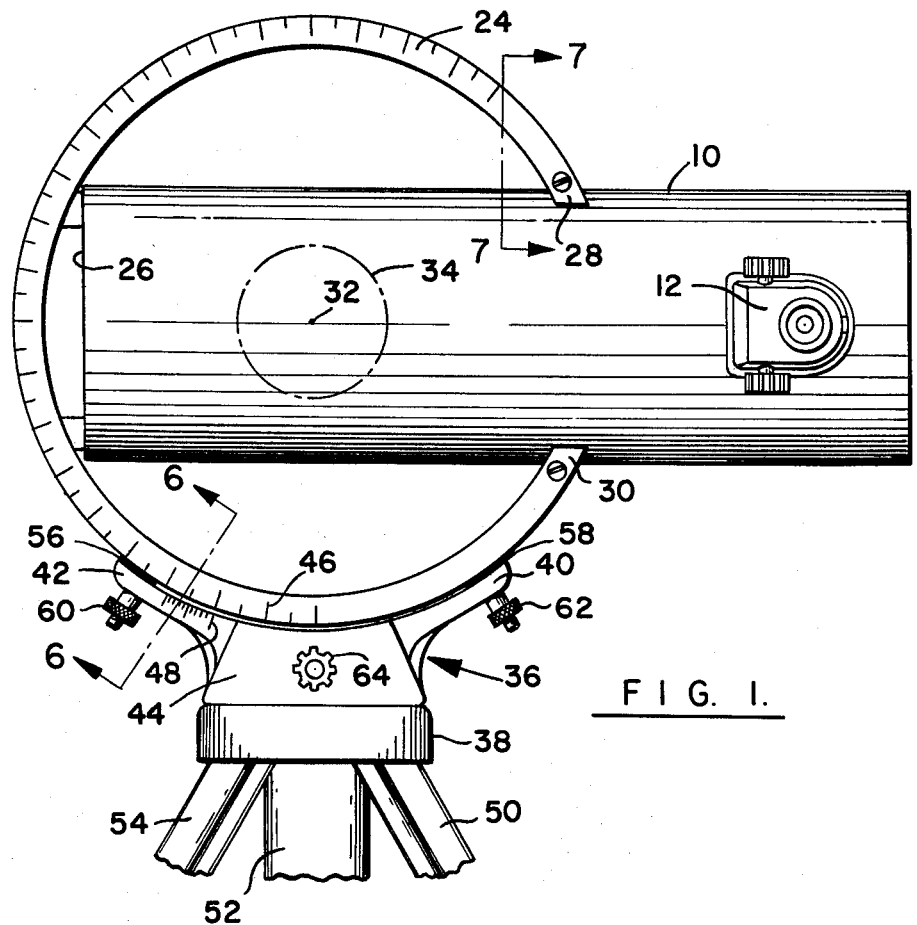
FIG. 1 is an elevational view of a Newtonian telescope embodying the invention.

FIG. 1 shows a cylindrical barrel 10 of a reflecting telescope of the Newtonian type. This telescope has an eyepiece 12 near one end. The principal optical axis of the telescope is aligned with the axis of cylindrical barrel 10.

Figure 2:
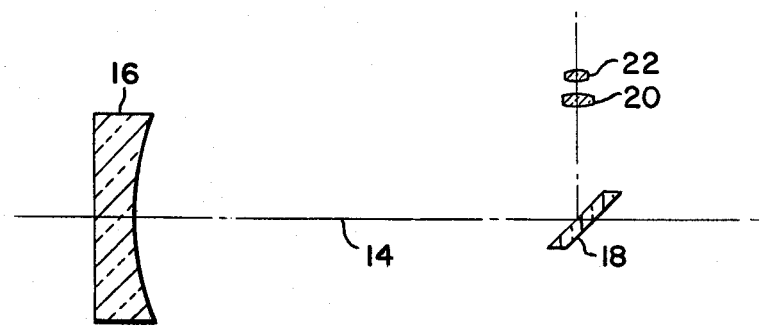
FIG. 2 is a schematic diagram showing the optics of the telescope of FIG. 1.

As shown in FIG. 2, the optical components include a primary mirror 16, and a diagonal mirror 18, both arranged on the principal optical axis 14, and eyepiece lenses 20 and 22 adjacent the diagonal mirror.

The primary mirror is located near the end of the telescope barrel opposite the end at which the eyepiece is located.

Returning to FIG. 1, a circular mounting ring 24 extends around end 26 of barrel 10, with its ends 28 and 30 secured to opposite sides of the barrel at an intermediate location along the length of the barrel.

The ring axis is indicated at 32. The ring axis is preferably substantially perpendicular to the principal optical axis of the telescope, and preferably intersects the principal optical axis of the telescope or comes at least very close to it. The mounting ring, and the telescope barrel, including its various optical components, constitute a rigid unit, the center of gravity of which is preferably located approximately on the ring axis 32, i.e. within a small imaginary circle 34 centered on the ring axis. As the barrel of the telescope extends outside of ring 24, the principal factor in determining the position of the center of gravity of the rigid system is the weight of the primary mirror cell. This is preferably chosen to bring the center of gravity of the rigid system as close as possible to ring axis 32.

The ring is supported by cradle 36, which is, in turn, supported on table 38 for rotation about a vertical axis.

Cradle 36 has an arcuate upper surface comprising arms 40 and 42 which extend respectively forwardly and rearwardly from a frusto-conical body 44.

Although ring 24 can have various cross-sectional shapes, its outline is preferably rectangular so that its side, as seen in FIG. 1 is entirely in a plane. This plane is substantially aligned with a plane which defines the sides of cradle arms 40 and 42 seen in FIG. 1. Markings 46 on the planar face of ring 24 cooperate with markings 48 on the cradle to provide for accurate measurement of elevation. Similar markings, not shown, on body 44 and table 38 can be used to measure azimuth. The large diameter of the ring facilitates elevation readings. It is, of course, a simple matter to convert between azimuth and elevation on the one hand and right ascension and declination on the other, using computers or programmable pocket calculators. Thus, the fact that the readings given by this telescope system are in terms of azimuth and elevation is not a serious disadvantage.

Extending downwardly from table 38 are three tripod legs 50, 52 and 54. The table can, of course, be mounted on a support other than a tripod, for example, a pedestal.

As seen in FIG. 1, mounting ring 24 rests upon felt pads 56 and 58 which are located respectively on arms 42 and 40 of the cradle. Because the mounting ring is of a large diameter, because the center of gravity of the rigid system is located near the ring axis, and because the pads frictionally engage the outer surface of the ring, the principal axis of the telescope will remain in any chosen position. The elevation of the telescope can be adjusted manually without a great deal of effort, but, once the elevation is set, the telescope will remain in that setting unless it is disturbed by a force similar in magnitude to that required for adjustment.

Because the rigid system comprising the telescope assembly and the ring can be somewhat unbalanced, and because it may be desired to lock the telescope at a particular elevation, adjusters 60 and 62 are provided. These adjusters can be used to increase the friction between the felt pads and the mounting ring. This is desirable where an unbalanced condition exists, for example where a special eyepiece is used. These adjusters can be further tightened to lock the elevation of the telescope at a particular desired setting. This is frequently necessary in order to fix the telescope on a particular astronomical object which is to be viewed by a group. It is also desirable for astrophotography, where a camera is mounted on the telescope eyepiece assembly, giving rise to a more serious unbalanced condition.

Knob 64 is a tightening knob for locking the cradle against rotation about a vertical axis in order to fix the azimuth setting of the telescope or to apply friction to prevent minor disturbances from affecting the azimuth setting.

While the invention lends itself well to Newtonian telescopes, which are normally characterized by an eyepiece located near one end of the barrel and a primary mirror located near the other end of the barrel, the invention also lends itself to use with any of the various reflecting telescopes utilizing secondary mirrors. With this type of telescope, the invention gives rise to a very useful and important advantage, namely a fixed or substantially fixed eyepiece height.

Figure 3:
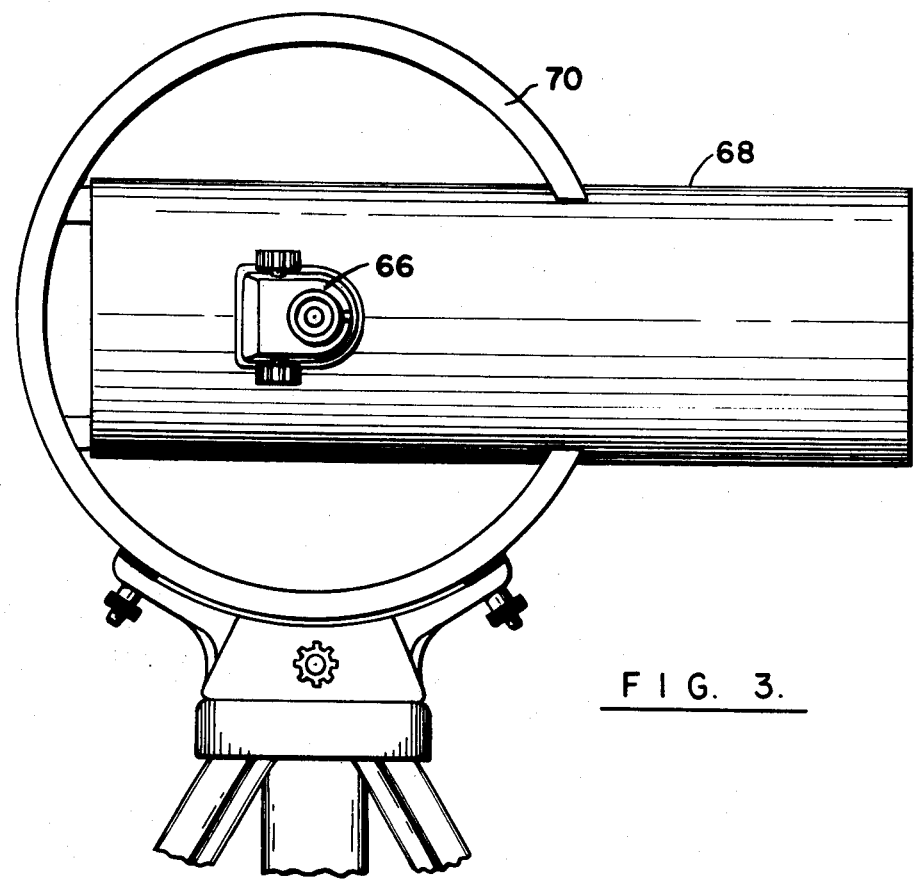
FIG. 3 is an elevational view showing a special version of the invention having an eyepiece which remains at a fixed height.

Various categories of reflecting telescopes utilize secondary mirrors. These telescopes include the Cassegrain, the Maksutov, the Gregorian, and the Schmidt- Cassegrain. The more popular versions of these telescopes utilize primary mirrors with central apertures, and have their eyepieces directly behind their primary mirrors. However, they can also be designed with diagonal mirrors, and with their eyepieces on the sides of their barrel, as indicated in FIG. 3, where eyepiece 66 is located on the side of barrel 68. In comparing the telescope of FIG. 3 with that of FIG. 1, it will be noted that eyepiece 66 is located near the mirror end of the telescope, and at or very near the axis of mounting ring 70.

Figure 4:
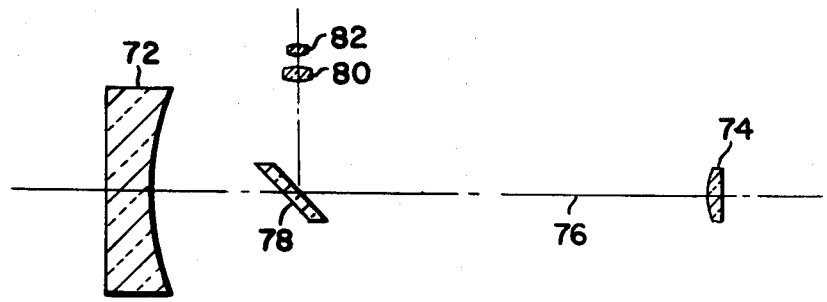
FIG. 4 is a schematic diagram showing a typical optical configuration of the telescope of FIG. 3.

The optical configuration of a typical telescope having a diagonal mirror and an eyepiece to the side is shown in FIG. 4. Primary mirror 72 and secondary mirror 74 are arranged along the principal optical axis 76. Diagonal mirror 78 is located near primary mirror 72, and eyepiece lenses 80 and 82 are located to the side of the diagonal mirror. This configuration is that of a Cassegrain telescope. The configurations of the Maksutov, Gregorian and Schmidt-Cassegrain designs are similar.

In the telescope of FIG. 3, as there is no pivoting mechanism at the center of rotation, and the eyepiece axis is centered or approximately centered on mounting ring 70, the telescope can be moved through its entire range of elevation without appreciable change in the position of the eyepiece. This is particularly advantageous, because the tripod or other support can be set to a height comfortable to the observer, who then need not move at all as the elevation of the telescope is adjusted.

The configuration of FIG. 3 also has the advantage of reducing overall weight of the telescope. Since the eyepiece is located substantially on the axis of the mounting ring rather than at the end of the telescope remote from the primary mirror, the weight of the primary mirror cell can be reduced without affecting the balance of the telescope.

Various structural details common to the telescopes of FIGS. 1 and 3 will now be described with reference to FIGS. 5 through 8.

Figure 5:
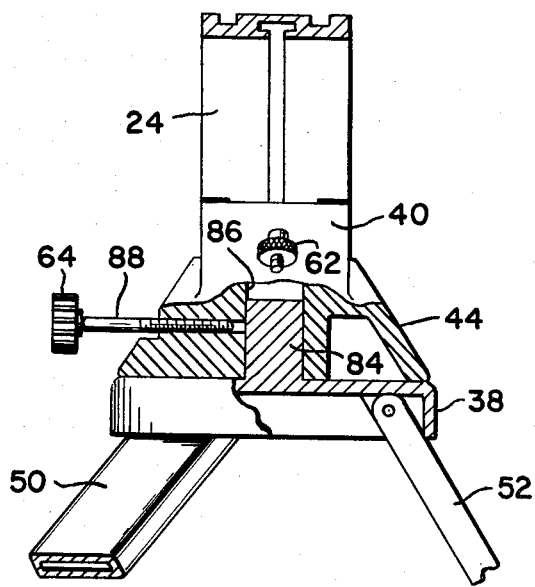
FIG. 5 is an elevational view, partly in section, showing internal details of the telescope cradle, and particularly the means allowing for azimuth adjustment.

FIG. 5 shows table 38 with an upwardly extending circular cylindrical projection 84 which fits with a running clearance into hole 86 in the bottom of frusto-conical body 44 of the cradle. Knob 64 controls a threaded shaft 88, which is threaded into cradle body 44 and arranged to engage projection 84 to lock the cradle against rotation about a vertical axis.

Figure 6:
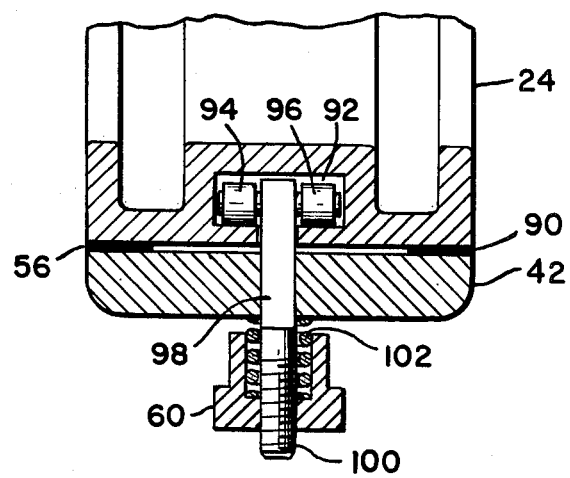
FIG. 6 is a vertical section taken on the plane 6—6 of FIG. 1, showing details of the frictional pads on the cradle, and of the mounting ring tightening means.

FIG. 6 provides a view of ring 24 resting on felt pads 56 and 90 of cradle arm 42. The ring, which is preferably an extrusion of aluminum or another suitable material, has a T-shaped groove 92 which encloses rollers 94 and 96 mounted on a cross-shaft fixed on rod 98. Rod 98 preferably has a square cross-section or another keyed shape and fits into a conforming hole extending through cradle arm 42. This prevents rod 98 from rotating, which would result in jamming of the rollers. Rod 98 extends through the leg of T-shaped groove 92. Adjuster 60 is threaded onto threads 100 formed on a round lower part of rod 98. Coil spring 102 is in compression between adjuster 60 and the lower face of cradle arm 42, and causes rollers 96 and 94 to exert a downward force on the floor of groove 92, thus pressing ring 24 against pads 56 and 90. This force is adjustable by rotation of adjuster 60, which varies the compression of spring 102.

Adjuster 62 (FIG. 1) and its associated parts are substantially identical to what is shown in FIG. 6.

Figure 7:
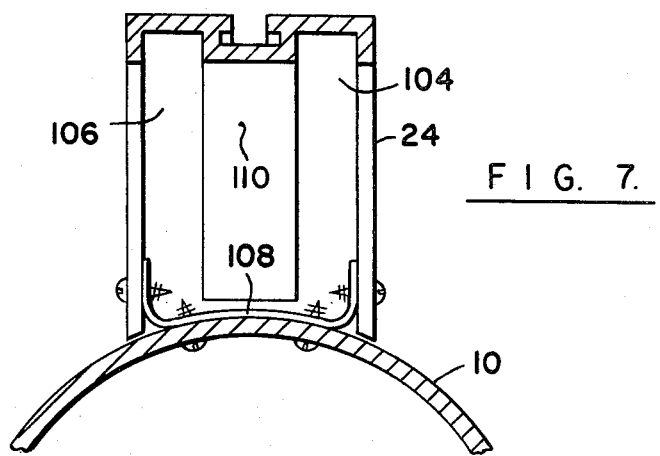
FIG. 7 is a sectional view taken on the plane 7—7 of FIG. 1, showing the means by which an end of the mounting ring is secured to the telescope barrel.

Referring to FIG. 7, mounting ring 24, being an extrusion, has a uniform cross-section throughout its entire length except at its ends. This cross-section includes grooves 104 and 106 on the inwardly facing side of the ring. These grooves are provided not only for weight reduction, but also for the accommodation of metal clip 108, by which the ring is secured to telescope barrel 10. Sheet metal screws are used, as shown, to secure clip 108 to the ring and barrel. The opposite end of the ring is secured to the barrel in a similar manner. In general, the two ends of the ring are secured to opposite sides of the barrel at intermediate locations along the length of the barrel, between the midpoint and the end opposite to the end where the primary mirror is located. The mounting ring is secured to the barrel so that it is intersected by the principal optical axis of the telescope.

Figure 8:
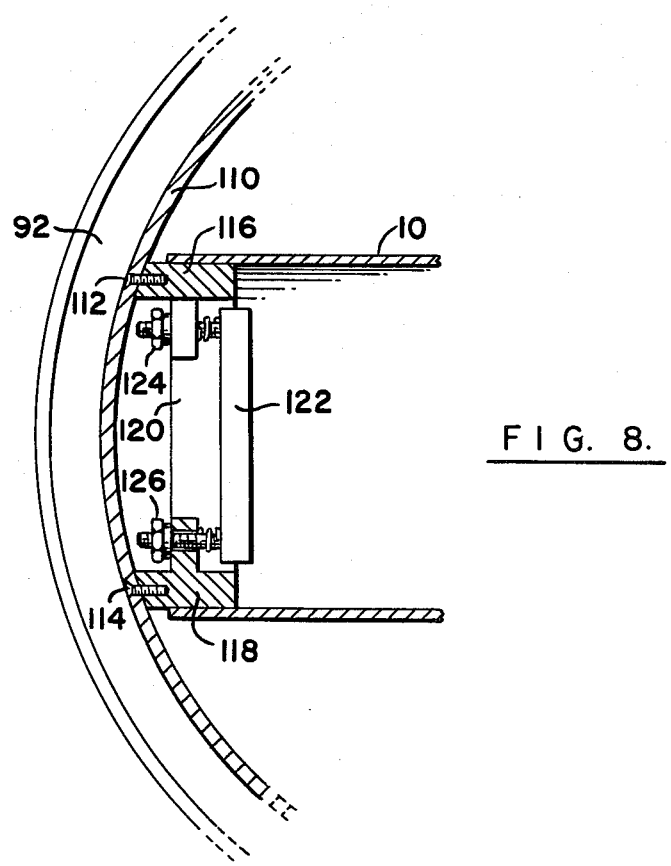
FIG. 8 is a fragmentary section taken along a plane parallel to the barrel axis and perpendicular to the mounting ring axis, showing details of the means by which the mounting ring is secured to the mirror end of the telescope barrel.

Referring to FIG. 8, the mirror end of the telescope is secured to wall 110 of the ring (see also FIG. 7 for a clearer identification of wall 110) by means of screws 112 and 114. These screws are threaded into feet 116 and 118 of end ring 120 which is fixed to the mirror end of barrel 10 by suitable means (not shown). Primary mirror cell 122 is mounted on end ring 116 in the usual manner, and adjusting nuts are provided at 124 and 126 for fine adjustment of the position of the mirror cell.

Numerous modifications can be made to the telescope described above. For example, instead of using a T-shaped undercut groove and a clamp with rollers to hold the mounting ring on the cradle, the ring can be held by suitable clamps grasping the exterior of the ring. As another example, the ring can be provided with gear teeth and driven by a suitable hand-rotated worm gear. Although the ring desirably extends beyond the mirror end of the telescope barrel, as shown in FIGS. 1 and 3, this is not necessarily the case. The mounting ring can consist of two ring elements on opposite sides of the telescope barrel and still achieve many of the advantages of the invention, so long as it extends to the approximate location of the mirror end of the barrel and has its axis extending through the approximate location of the center of gravity of the system comprising the ring and the telescope assembly.

Further modifications, including the adaptation of the invention to various alternative forms of telescopes, can be made without departing from the scope of the invention as defined in the following claims.

I claim:

1. A telescope comprising:
    a telescope assembly having a barrel with a principal optical axis and optical means associated with the barrel for collecting light from an object located on said principal optical axis and forming an image of said object;
    a circular mounting ring fixed to the barrel and having its axis arranged substantially perpendicular to said principal optical axis and approximately intersecting the center of gravity of the combination of the circular mounting ring and the telescope assembly, the circular mounting ring extending to the approximate location of one end of the barrel; and
    cradle means engaging the periphery of the circular mounting ring and thereby supporting said circular mounting ring while permitting rotation of said circular mounting ring about its axis for adjustment of the direction of the optical axis of the telescope perpendicular to the circular mounting ring axis, said cradle means and said circular mounting ring having cooperating means for maintaining the circular mounting ring axis in fixed relationship to the cradle and for constraining said ring against translational movement with respect to the cradle along the circular mounting ring axis.

2. A telescope according to claim 1 including means supporting said cradle means for rotation about an axis substantially perpendicular to the axis of the circular mounting ring.

3. A telescope according to claim 1 in which the circular mounting ring extends around said one end of the barrel and is intersected by said principal optical axis.

4. A telescope accqrding to claim 1 having elevation markings on said circular mounting ring and a reference mark on said cradle positioned to cooperate with said elevation markings.

5. A telescope according to claim 1 in which said optical means includes an eyepiece positioned substantially on the axis of said circular mounting ring.

6. A telescope according to claim 1 in which the optical means comprises a primary mirror located adjacent said one end of the telescope barrel, a secondary mirror located adjacent the opposite end of the telescope barrel, a diagonal mirror located within said barrel substantially at the location of the axis of said circular mounting ring, and an eyepiece positioned substantially on the axis of said circular mounting ring.

7. A telescope according to claim 1 in which said cradle means includes frictional means for engaging the periphery of said circular mounting ring.

8. A telescope according to claim 1 including locking means for securing said circular mounting ring in fixed relationship to the cradle means.

9. A telescope according to claim 1 in which said cradle means includes frictional means for engaging the periphery of said circular mounting ring, and including means for urging the periphery of said circular mounting ring against said frictional means.

10. A telescope according to claim 1 in which said cradle means includes frictional means for engaging the periphery of said circular mounting ring, and including means for urging the periphery of said circular mounting ring against said frictional means and adjusting means for varying the force with which circular mounting ring is urged against said frictional means.

11. A telescope according to claim 1 in which said circular mounting ring has a circumferential groove in its periphery having at least one undercut surface, and said cradle means includes frictional means for engaging the periphery of said circular mounting ring on both sides of said groove, and including clamp means extending into said undercut groove and arranged to engage said undercut surface, and means imparting a force to said clamp means, said force having a component directed radially outwardly with respect to the circular mounting ring and urging the periphery of said circular mounting ring against said frictional means.

12. A telescope according to claim 1 in which said circular mounting ring has a circumferential groove in its periphery having at least one undercut surface, and said cradle means includes frictional means for engaging the periphery of said circular mounting ring on both sides of said groove, and including clamp means extending into said undercut groove, said clamp means including roller means arranged to engage said undercut surface, and means imparting a force to said roller means, said force having a component directed radially outwardly with respect to the circular mounting ring and urging the periphery of said circular mounting ring against said frictional means.

13. A telescope according to claim 1 in which said circular mounting ring has a circumferential groove in its periphery having at least one undercut surface, and said cradle means includes frictional means for engaging the periphery of said circular mounting ring on both sides of said groove, and including clamp means extending into said undercut groove and arranged to engage said undercut surface, spring means imparting a force to said clamp means said force having a component directed radially outwardly with respect to the circular mounting ring and urging the periphery of said circular mounting ring against said frictional means, and means for adjusting the stress in said spring means, thereby adjusting the friction between the periphery of said circular mounting ring and said frictional means.

* * * * *

UNITED STATES PATENT AND TRADEMARK OFFICE
CERTIFICATE OF CORRECTION

PATENT NO. : 4,470,672
DATED : September 11, 1984
INVENTOR(S) : Clyde O. Drauglis It is certified that error appears in the above-identified patent and that said Letters Patent are hereby corrected as shown below:

Column 1, line 46, "U.S." should start a new paragraph;

Column 6, lines 63-64, insert --in a plane-- after "telescope";

Column 8, line 1, insert --said-- after "which".

Signed and Sealed this

Twenty-sixth Day of February 1985

[SEAL]

Attest:

DONALD J. QUIGG

Attesting Officer     Acting Commissioner of Patents and Trademarks